United States Patent
Kopanski et al.

(10) Patent No.: US 10,703,468 B2
(45) Date of Patent: Jul. 7, 2020

(54) STRESS REDUCING HOLES

(71) Applicant: Sikorsky Aircraft Corporation, Stratford, CT (US)

(72) Inventors: Krzysztof Kopanski, Trumbull, CT (US); Justin Thomas, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 191 days.

(21) Appl. No.: 15/756,777

(22) PCT Filed: Sep. 13, 2016

(86) PCT No.: PCT/US2016/051459
§ 371 (c)(1),
(2) Date: Mar. 1, 2018

(87) PCT Pub. No.: WO2017/048683
PCT Pub. Date: Mar. 23, 2017

(65) Prior Publication Data
US 2018/0237133 A1  Aug. 23, 2018

Related U.S. Application Data

(60) Provisional application No. 62/219,886, filed on Sep. 17, 2015.

(51) Int. Cl.
*B64C 27/473* (2006.01)
(52) U.S. Cl.
CPC ................. *B64C 27/473* (2013.01)
(58) Field of Classification Search
CPC ................................... B64C 27/473
See application file for complete search history.

(56) References Cited

U.S. PATENT DOCUMENTS 2,156,133 A * 4/1939 Troller .................... B64C 11/24
416/91
2,638,990 A * 5/1953 Pitcairn ................. B64C 27/325
416/90 R
(Continued)

FOREIGN PATENT DOCUMENTS

EP          0631930 A1   1/1995
WO   WO-2016/108997 A2   7/2016

OTHER PUBLICATIONS

Reaz A. Chaudhuri, A. Sinan Oktem, C. Guedes Soares; "Stress concentration/intensity around elliptical/circular cylinder shaped surface surface flaws in cross-ply plates and validity of St. Venant's principle in the presence of interacting singularities"; 2012 Elsevier Inc.; 1362-1377 (Year: 2012).*

(Continued)

*Primary Examiner* — Woody A Lee, Jr.
*Assistant Examiner* — Brian Christopher DelRue
(74) *Attorney, Agent, or Firm* — Cantor Colburn LLP

(57) ABSTRACT

A blade includes a blade body having a surface and a hole extending through the surface of the blade body. The hole defines a hole axis and a plane perpendicular to the hole axis. The hole has an elongated hole perimeter within the plane. The hole perimeter includes a plurality of non-linear perimeter sections to minimize stress concentration around the elongated hole perimeter while maximizing the usable opening area. A rotor system includes a rotor hub and a blade as recited above. The blade extends radially outward from the rotor hub. The blade defines a root end proximate to the rotor hub, a tip end opposite the root end.

13 Claims, 3 Drawing Sheets

(56) References Cited

U.S. PATENT DOCUMENTS

| | | | |
|---|---|---|---|
| 3,559,927 A | 2/1971 | Baekken | |
| 3,713,750 A | 1/1973 | Williams | |
| 4,319,722 A | 3/1982 | Pesando | |
| 4,655,685 A | 4/1987 | Fradenburgh | |
| 4,695,341 A * | 9/1987 | Matuska | B29C 53/564 156/161 |
| 4,786,014 A | 11/1988 | Pesando et al. | |
| 4,930,983 A * | 6/1990 | Byrnes | B29C 70/887 416/134 A |
| 5,687,930 A | 11/1997 | Wagner et al. | |
| 5,813,625 A | 9/1998 | Hassan et al. | |
| 6,004,095 A * | 12/1999 | Waitz | B64C 21/025 415/119 |
| 6,203,269 B1 * | 3/2001 | Lorber | B64C 11/18 244/207 |
| 6,283,406 B1 | 9/2001 | Remington et al. | |
| 7,025,304 B2 | 4/2006 | Kolliopoulos | |
| 7,097,427 B2 * | 8/2006 | Kuhns | B64C 27/008 416/144 |
| 7,354,247 B2 * | 4/2008 | Bonnet | F03D 1/0633 415/905 |
| 8,052,378 B2 * | 11/2011 | Draper | F01D 5/186 415/115 |
| 8,066,482 B2 * | 11/2011 | Strohl | F01D 5/186 415/115 |
| 8,955,801 B2 | 2/2015 | Mcgeer et al. | |
| 9,004,394 B2 | 4/2015 | van der Westhuizen | |
| 9,505,492 B2 * | 11/2016 | Scott | B64C 27/463 |
| 2004/0136831 A1 | 7/2004 | Barb et al. | |
| 2005/0254947 A1 * | 11/2005 | Loftus | B64C 27/008 416/144 |
| 2006/0056969 A1 | 3/2006 | Jacala et al. | |
| 2006/0171807 A1 | 8/2006 | Lee | |
| 2007/0131382 A1 * | 6/2007 | Otero | B22C 9/04 164/516 |
| 2010/0129213 A1 | 5/2010 | Strohl et al. | |
| 2013/0071255 A1 | 3/2013 | Yokoyama | |
| 2013/0280091 A1 * | 10/2013 | Propheter-Hinckley | B22C 9/10 416/97 A |
| 2017/0334554 A1 * | 11/2017 | Kopanski | B64C 27/06 |

OTHER PUBLICATIONS

Grommet Definition—Wikipedia; May 2015 (Year: 2015).*
Rufin, A. C., "Fastener Hole Reinforcement in Composites Using Cold Expanded Inserts," Journal of Composites Technology & Research, JCTRER, vol. 17, No. 2, Apr. 1995, pp. 145-151. (Year: 1995).*
PCT International Search Report and Written Opinion dated Dec. 2, 2016 issued during the prosecution of PCT International Patent Application No. PCT/US2016/051459 (10 pages).
International Preliminary Report on Patentability; International Application No. PCT/US2016/051459; International Filing Date: Sep. 13, 2016; dated Mar. 20, 2018; 1 Page.

* cited by examiner

STRESS REDUCING HOLES

CROSS-REFERENCE TO RELATED APPLICATION

This application is a 35 U.S.C. § 371 National Phase Application of International PCT Patent Application No. PCT/US2016/051459, filed on Sep. 13, 2016, which claims the benefit of and priority to U.S. Provisional Application Ser. No. 62/219,886 filed Sep. 17, 2015. The entire contents of these applications are incorporated herein by reference in their entirety.

STATEMENT REGARDING FEDERALLY SPONSORED RESEARCH OR DEVELOPMENT

This invention was made with Government support under FA8650-13-C-7304 awarded by the United States Department of Defense. The Government has certain rights in this invention.

BACKGROUND OF THE INVENTION

1. Field of the Invention

The present disclosure relates to rotary-wing aircraft, and more particularly to a rotor blade for such aircraft.

2. Description of Related Art

Traditional rotorcraft, such as conventional helicopters, include a rotor hub configured to rotate about an axis and having multiple rotor-blade assemblies mounted thereto. Each rotor-blade assembly includes a blade that extends outwardly from the rotor hub.

A large number of slots, holes, or other openings may be formed. (e.g., by drilling) in an upper surface of the blade at spaced locations. The upper surface can be made of a carbon-fiber composite. These slots, holes or other openings can be subject to stress.

Such conventional methods and systems have generally been considered satisfactory their intended purpose. However, there is still a need in the art for improved openings.

SUMMARY OF THE INVENTION

A blade includes a blade body having a surface and a hole extending through the surface of the blade body. The hole defines a hole axis and a plane perpendicular to the hole axis. The hole has an elongated hole perimeter within the plane. The hole perimeter includes a plurality of non-linear perimeter sections to minimize stress concentration around the elongated hole perimeter while maximizing the usable opening area.

In accordance with certain embodiments, the non-linear perimeter sections include two spaced apart opposed parabolic conic sections. Each parabolic conic section can include a pair of endpoints and a vertex. A centerline axis of the elongated hole perimeter can extend between the vertices within the plane. The non-linear elongated perimeter can include two spaced apart opposed circular arcs. Each circular arc includes a pair of endpoints. One of the endpoints from each of the parabolic sections can connect with respective endpoints of one of the circular arcs. The other endpoints from each of the parabolic sections can connect with respective endpoints of the other circular arc.

The parabolic conic sections and the circular arcs can alternate with one another about the hole perimeter. The parabolic conic sections and the circular arcs can be convex around the entirety of the perimeter and are concave relative to the hole. At each connection of one of the end points of the circular arcs and a respective end point of the parabolic conic section, the circular arc can be tangential to the parabolic conic section. Tangent lines defined through the respective vertices of each of the parabolic conic sections can be perpendicular to the centerline axis within the plane.

The blade body can define a blade axis. The elongated hole perimeter can have a first dimension in a first direction aligned with the blade axis and a second dimension in a second direction. The first and second directions can be perpendicular to one another and the first dimension is greater than the second dimension such that the elongated hole perimeter is elongated in alignment with the blade axis.

The blade can include a structural ring disposed on an inner surface of the hole to provide reinforcement and to reduce warping of the hole. The structural ring can be a thin-walled ring made of at least of one titanium or steel. The hole can be arranged adjacent to a leading edge of the blade body. The hole can be one of a plurality of spaced apart holes that are substantially identical and aligned with respect to each other.

In another aspect, a rotor system includes a rotor hub and a blade as recited above. The blade extends radially outward from the rotor hub. The blade defines a root end proximate to the rotor hub, a tip end opposite the root end. The hole can be one of a plurality of spaced apart holes that are substantially identical and aligned with respect to one another's centerline axes along the rotor blade. In yet another aspect, an aircraft includes the rotor system as recited above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
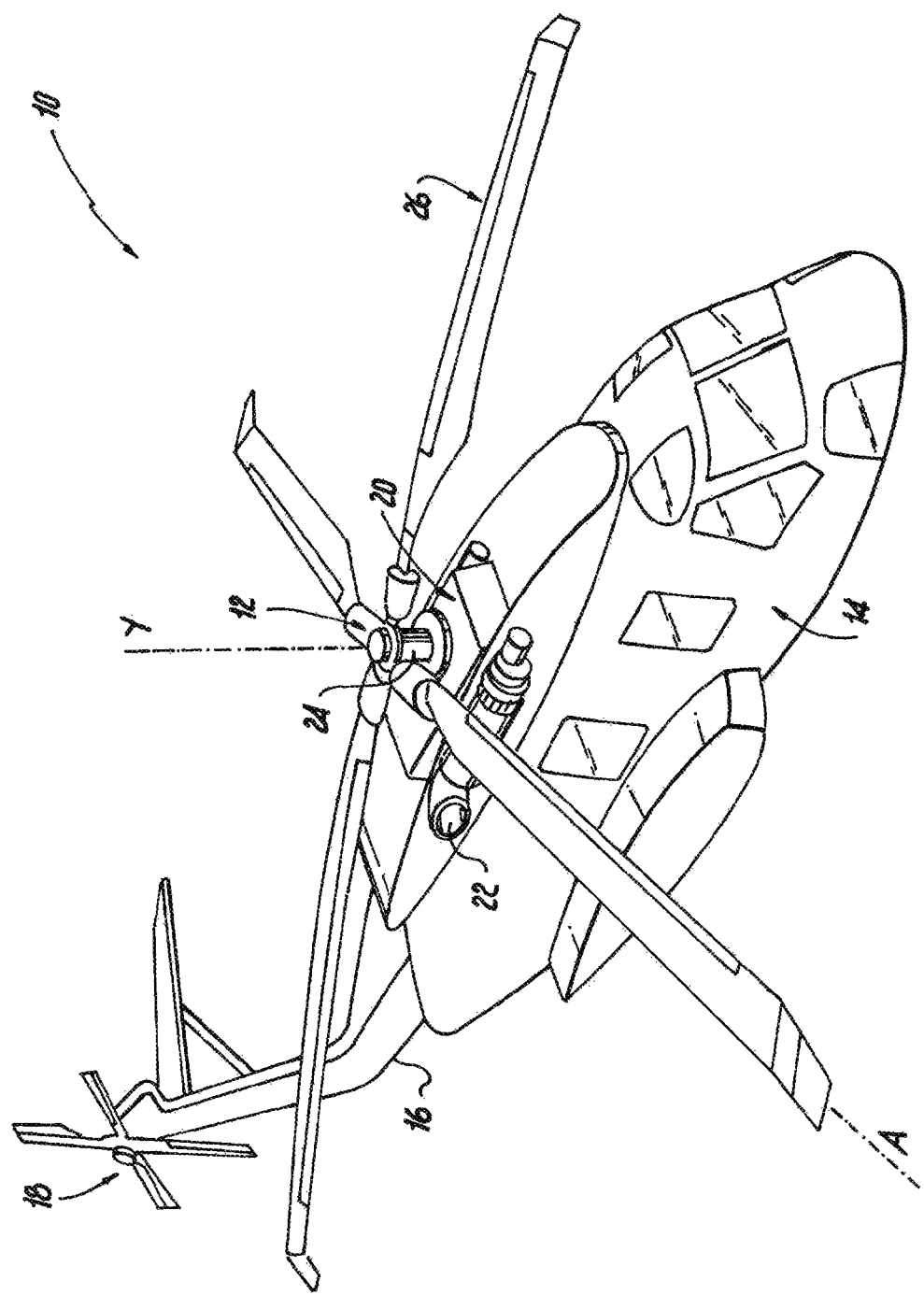
FIG. 1 is a perspective view of an exemplary embodiment a rotorcraft constructed in accordance with the present disclosure, showing a rotor hub with rotor blades extending therefrom.

Reference will now be made to the drawings wherein like reference numerals identify similar structural features or aspects of the subject disclosure. For purposes of explanation and illustration, and not limitation, a partial view of an exemplary embodiment of a rotorcraft in accordance with the disclosure is shown in FIG. 1 and is designated generally by reference character 10. Other embodiments of rotorcraft in accordance with the disclosure, or aspects thereof, are provided in FIGS. 2-6, as will be described.

As shown in FIG. 1, a non-limiting exemplary embodiment of a rotary-wing aircraft in which the invention can be implemented is generally indicated at 10. Although the aircraft 10 disclosed herein is a helicopter 10, it is understood that aircraft 10 can be any suitable type of aircraft or machine. For example, a high-speed-compound rotary-wing aircraft with supplemental translational-thrust systems, a dual contra-rotating co-axial rotor-system aircraft, turboprops, tilt-rotors, and a tilt-wing aircraft can benefit from the invention. Furthermore, although the invention is disclosed herein as being implemented with main rotor blades or tail-rotor blades, for example, those having "Retreating Side Blowing" (hereinafter referred to as merely "RSB") technology, it is understood that the invention can be implemented with any suitable technology that requires openings in a blade, such as those used for weight cups for holding weights to balance rotor blades. In addition, it is understood that the invention can be implemented with any other airfoil-type blade, such as a stationary or wind vane, wind-turbine blade, or propeller blade on fixed-wing aircraft. Moreover, it is understood that the invention can be applied just the same to, in general, any suitable beam under load having holes.

With continued reference to FIG. 1, aircraft 10 includes a main rotor system 12 and an airframe 14 having an extending tail 16 that mounts a tail-rotor system 18 as an anti-torque system. Main rotor system 12 is driven about an axis of rotation Y through a main gearbox 20 by at least one engine 22 (two shown in the figure). Main rotor system 12 also includes a rotor hub 24 having a plurality of rotor blades 26 (four shown in the figure), mounted to and projecting radially outwardly from the rotor hub 24. Blades 26 may be made of a composite material. Those skilled in the art will readily appreciate that helicopter 10 can have any suitable configuration. It is also understood that the contour and cross-section (in size and shape) of blade 26 may vary over the length of blade 26. It is also understood that the blade 26 may be formed using known design and manufacturing processes.

Figure 2:
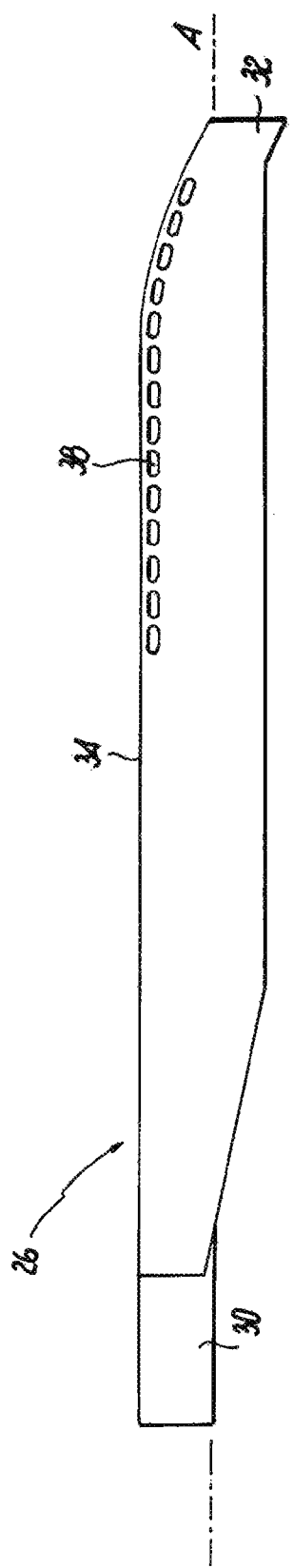
FIG. 2 is a top plan view of a rotor blade of the rotary-wing aircraft FIG. 1 constructed in accordance with an embodiment of the disclosure, showing holes through the upper surface of the rotor blade.
Figure 3:
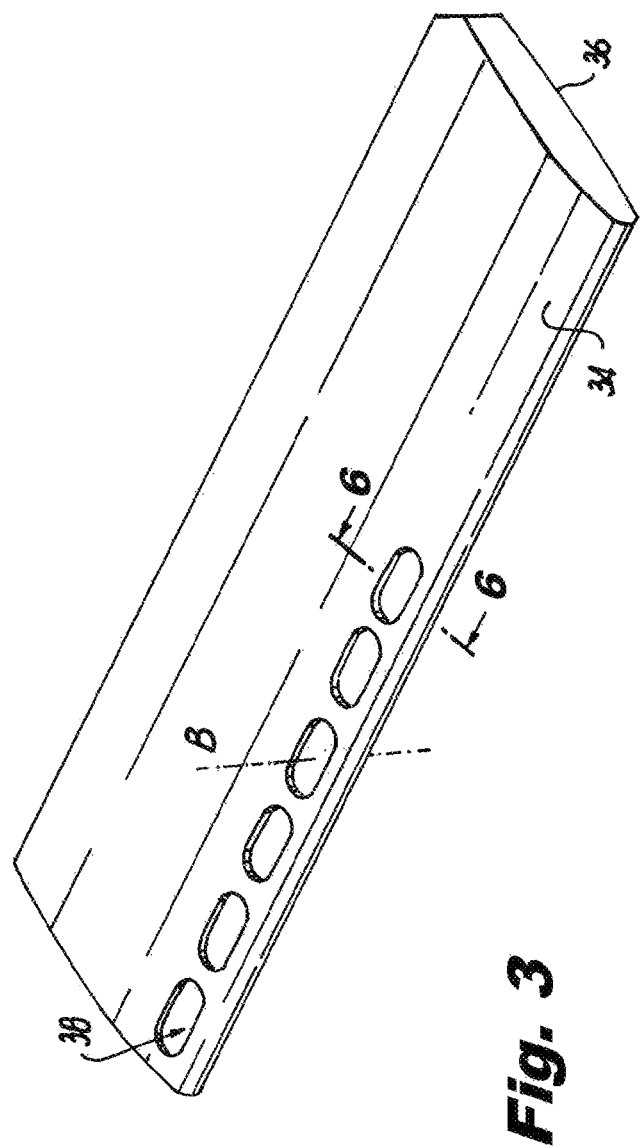
FIG. 3 is a perspective view of the rotor blade of FIG. 2, in accordance with an embodiment of the disclosure, showing the holes proximate, to the leading edge of the blade.

As shown in FIGS. 1-3, each blade 26 is configured to be coupled to the rotor hub 24 at a root end 30 of the blade 26 disposed opposite a tip end 32 of the blade 26. It is understood that root end 30 and tip end 32 can define any suitable geometry. Blade axis A is defined longitudinally between root end 30 and tip end 32. Blade 26, e.g. blade body, defines an upper surface 34 of the blade 26 and a lower surface 36 opposite the upper surface 34. It is contemplated that the blade 26 can be made of a carbon-fiber composite. Upper surface 34 of each blade 26 also includes a plurality of holes 38. Holes 38 are spaced apart from one another in a radial direction with respect to hub 24 along each blade 26. Holes 38 of each blade 26 are substantially identical and aligned with respect to one another's centerline axes C, shown in FIG. 4, and aligned with blade axis A.

Figure 4:
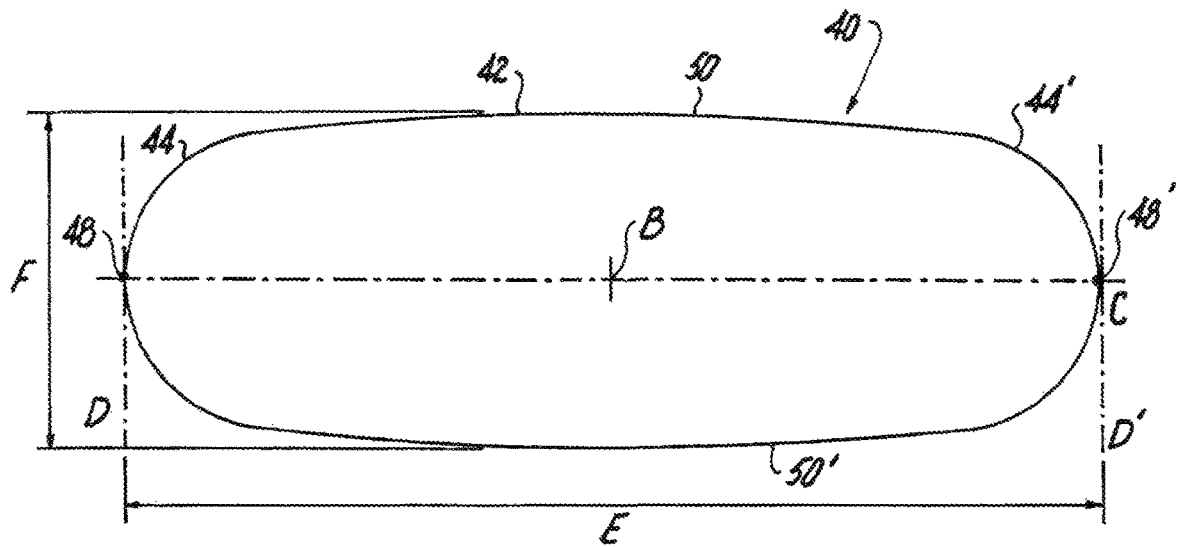
FIG. 4 is a plan view of a cross-section of one of the holes of the rotor blade of FIG. 2, in accordance with an embodiment of the disclosure, showing the elongated hole perimeter.

As shown in FIG. 4, a plane 40, e.g. a cross-sectional plane, of hole 38 is perpendicular to hole axis B is shown. Hole 38 has an elongated hole perimeter 42 within the cross-sectional plane 40 of hole 38. The elongated hole perimeter 42 includes a plurality of non-linear perimeter sections 41 (shown in FIG. 5) to minimize stress concentration around hole 38 while maximizing the usable opening area, for example, for connecting hole 38 to a variety of other devices or inserting devices within hole 38. Perimeter 42 has a first dimension E in a first direction substantially aligned with blade axis A and centerline axis C of hole 38 and a second dimension F in a second direction. First and second directions are perpendicular to one another. First dimension E is greater than second dimension F such that elongated hole perimeter 42 is elongated in alignment with blade axis A. Cross-section 40 remains substantially constant throughout the height of hole 38, e.g. along hole axis B. Reduced stress around perimeter 42 results in longer fatigue life for the part, and/or the option to manufacture a lighter-weight part.

Figure 5:
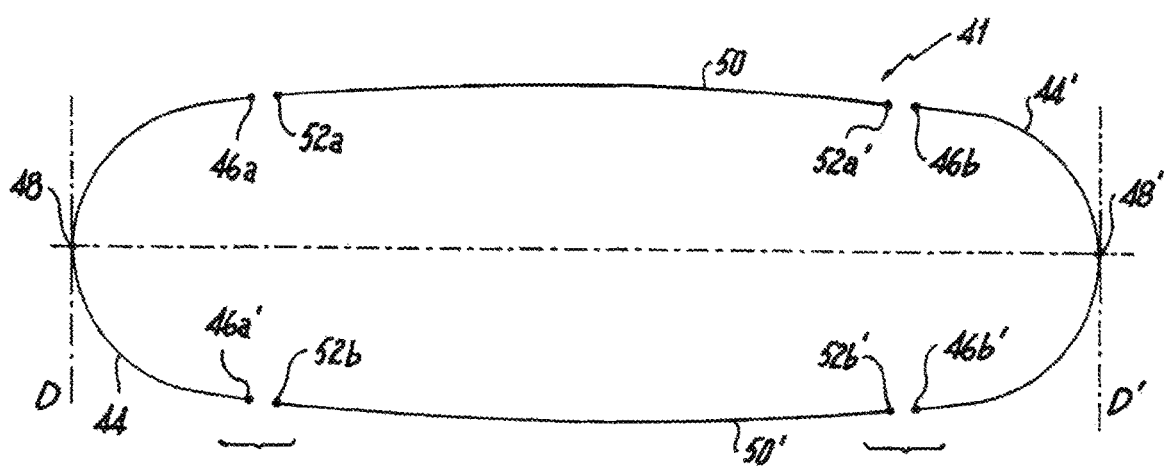
FIG. 5 is an exploded plan view of the cross-section of FIG. 4, in accordance with an embodiment of the disclosure, showing two spaced apart opposed parabolic conic sections and two spaced apart opposed circular arcs.

With continued reference to FIGS. 4 and 5, non-linear perimeter sections 41 include two spaced apart opposed parabolic conic sections 44 and 44' and two spaced apart opposed circular arcs 50 and 50'. Circular arcs 50 and 50' have large radii of curvature such that if circular arcs 50 and 50' were extended beyond the intersection with conic sections 44 and 44', each circular arc 50 and 50' would enclose each conic section 44 and 44' (i.e., circular arc 50 would enclose conic section 44, and circular arc 50' would enclose conic section 44'). Conic section 44 includes a vertex 48 and conic section 44' includes a vertex 48'. A centerline axis C of perimeter 42 extends between vertices 48 and 48' within the cross-sectional plane 40. Tangent lines defined through the respective vertices 48 and 48' of each of the parabolic conic sections, schematically indicated by lines D and D', are perpendicular to centerline axis C. Parabolic conic sections 44 and 44' and circular arcs 50 and 50' alternate with one another about perimeter 42 such that the opposing ends of conic section 44 connect to circular arcs 50 and 50' and opposing ends of conic section 44' also connect to circular arcs 50 and 50'. Parabolic conic sections 44 and 44' and circular arcs 50 and 50' are convex around the entirety of perimeter 42, and are concave relative to hole 38. The shape of hole 38 perimeter 42 allows more efficient use of hole 38 structure, for example, it reduces stress concentrations as compared with other traditional shapes such as circular, race track, or ellipse shapes. For example, race track shape holes tend to experience higher stress concentrations at the intersections between its linear sides and arcuate ends than those experienced at similar areas around perimeter 42 of hole 38.

As shown in FIG. 5, each parabolic conic section 44 and 44' includes a respective pair of endpoints 46*a* and 46*a*', and 46*b* and 46*b*'. Each circular arc 50 and 50' includes a pair of endpoints, 52*a* and 52*a*', and 52*b* and 52*b*'. Each circular arc 50 and 50' is tangential to each parabolic conic section 44 and 44' at a connection of the respective endpoints 46*a* and 46*a*' and 52*a* and 52*b*, and at a connection of the respective endpoints 46*b* and 46*b*' and 52*a*' and 52*b*'. Endpoint 46*a* of parabolic conic section 44 and endpoint 52*a* of circular arc 50 meet one another where circular arc 50 is tangential to parabolic conic section 44. Endpoint 46*a*' of parabolic conic section 44 and endpoint 52*b* of circular arc 50' meet one another where circular arc 50' is tangential to parabolic conic section 44. Endpoint 46b of parabolic conic section 44' and endpoint 52a' of circular arc 50 meet one another where circular arc 50 is tangential to parabolic conic section 44'. Endpoint 46b' of parabolic conic section 44' and endpoint 52b' of circular arc 50' meet one another where circular arc 50' is tangential to parabolic conic section 44'. While not required in all aspects, the perimeter 42 is non-linear (i.e., has no linear perimeter elements) in the shown embodiment.

Figure 6:
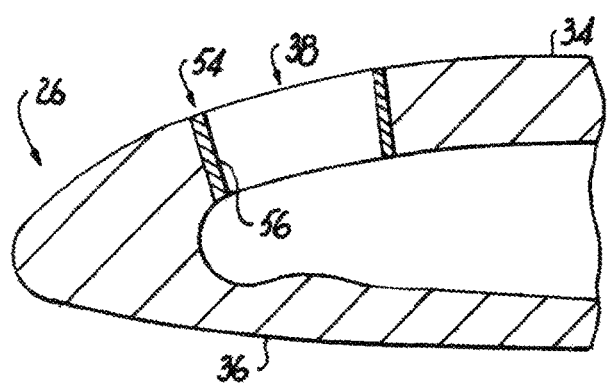
FIG. 6 is a perspective view of one of the holes of the rotor blade of FIG. 2, in accordance with another embodiment of the disclosure, showing the hole having a structural ring disposed on an inner surface of the hole.

With reference now to FIG. 6, in accordance with an embodiment of the disclosure, each hole 38 of rotor blades 26 includes a structural ring 54 disposed on an inner surface 56 of hole 38 to provide reinforcement and to reduce warping of hole 38. Those skilled in the art will readily appreciate that structural ring 54 can be a thin-walled ring made of a variety of suitable materials, such as, titanium, steel, or the like. It is contemplated that it is optional to include structural ring 54 in combination with hole 38, it is also contemplated that structural ring can be used with holes other than holes 38, e.g. race-track shaped holes. While not shown, it is understood that inserts can be included in the holes 38, such as inserts used for weight or RSB implementations and/or for aerodynamic reasons.

The methods and systems of the present disclosure, as described above and shown in the drawings, provide holes with superior properties including reduced stress. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A blade comprising:
   a blade body having a surface; and
   a hole extending through the surface of the blade body, wherein the hole defines a hole axis and a plane perpendicular to the hole axis, and wherein the hole has an elongated hole perimeter within the plane, wherein the hole perimeter includes a plurality of non-linear perimeter sections configured to minimize stress concentration around the elongated hole perimeter while maximizing the usable opening area,
   wherein the non-linear perimeter sections include:
   two spaced apart opposed parabolic conic sections, wherein each parabolic conic section includes a pair of endpoints and a vertex, wherein a centerline axis of the elongated hole perimeter extends between the vertices within the plane; and
   two spaced apart opposed circular arcs, wherein each circular arc includes a pair of endpoints, wherein one of the endpoints from each of the parabolic sections connects with respective endpoints of one of the circular arcs, and wherein the other endpoints from each of the parabolic sections connect with respective endpoints of the other circular arc.

2. The blade as recited in claim 1, wherein the parabolic conic sections and the circular arcs alternate with one another about the elongated hole perimeter.

3. The blade as recited in claim 1, wherein the parabolic conic sections and the circular arcs are convex around the entirety of the perimeter and are concave relative to the hole.

4. The blade as recited in claim 1, wherein, at each connection of one of the end points of the circular arcs and a respective end point of the parabolic conic section, the circular arc is tangential to the parabolic conic section.

5. The blade as recited in claim 1, wherein tangent lines defined through the respective vertices of each of the parabolic conic sections are perpendicular to the centerline axis within the plane.

6. The blade as recited in claim 1, wherein the blade body defines a blade axis, and wherein the elongated hole perimeter has a first dimension in a first direction aligned with the blade axis and a second dimension in a second direction, wherein the first and second directions are perpendicular to one another and wherein the first dimension is greater than the second dimension such that the elongated hole perimeter is elongated in alignment with the blade axis.

7. The blade as recited in claim 1, further comprising a structural ring disposed on an inner surface of the hole to provide reinforcement and to reduce warping of the hole.

8. The blade as recited in claim 7, wherein the structural ring is a thin-walled ring made of at least one titanium or steel.

9. The blade as recited in claim 1, wherein the hole is arranged adjacent to a leading edge of the blade body.

10. The blade as recited in claim 1, wherein the hole is one of a plurality of spaced apart holes that are substantially identical and aligned with respect to each other.

11. A rotor system comprising:
    a rotor hub;
    a blade as recited in claim 1 extending radially outward from the rotor hub, wherein the blade defines a root end proximate to the rotor hub, a tip end opposite the root end,
    wherein the non-linear perimeter sections include:
    two spaced apart opposed parabolic conic sections, wherein each parabolic conic section includes a pair of endpoints and a vertex, wherein a centerline axis of the elongated hole perimeter extends between the vertices within the plane; and
    two spaced apart opposed circular arcs, wherein each circular arc includes a pair of endpoints, wherein one of the endpoints from each of the parabolic sections connects with respective endpoints of one of the circular arcs, and wherein the other endpoints from each of the parabolic sections connect with respective endpoints of the other circular arc.

12. The rotor system as recited in claim 11, wherein the hole is one of a plurality of spaced apart holes that are substantially identical and aligned with respect to one another's centerline axes along the rotor blade.

13. An aircraft comprising the rotor system of claim 11.

* * * * *